(12) United States Patent
Holenstein et al.

(10) Patent No.: US 11,599,528 B1
(45) Date of Patent: *Mar. 7, 2023

(54) DYNAMIC MIXED-MODE METHOD FOR COMBINING ACTIVE/ACTIVE AND VALIDATION ARCHITECTURES FOR DISTRIBUTED LEDGERS

(71) Applicant: Gravic, Inc., Malvern, PA (US)

(72) Inventors: Bruce D. Holenstein, Media, PA (US); Dylan R. Holenstein, Media, PA (US); Paul J. Holenstein, Downingtown, PA (US)

(73) Assignee: GRAVIC, INC., Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/737,199

(22) Filed: May 5, 2022

Related U.S. Application Data

(63) Continuation of application No. 16/560,461, filed on Sep. 4, 2019, now Pat. No. 11,327,955, which is a continuation of application No. 16/520,904, filed on Jul. 24, 2019, now Pat. No. 10,642,826, which is a continuation-in-part of application No. 16/276,296, filed on Feb. 14, 2019, now Pat. No. 10,467,223.

(60) Provisional application No. 62/748,844, filed on Oct. 22, 2018, provisional application No. 62/725,015, filed on Aug. 30, 2018.

(51) Int. Cl.
*G06F 16/20* (2019.01)
*G06F 16/23* (2019.01)
*G06F 16/27* (2019.01)

(52) U.S. Cl.
CPC ...... *G06F 16/2379* (2019.01); *G06F 16/2365* (2019.01); *G06F 16/273* (2019.01)

(58) Field of Classification Search
CPC . G06F 16/2379; G06F 16/2365; G06F 16/273
USPC ........................................................ 707/615
See application file for complete search history.

(56) References Cited

U.S. PATENT DOCUMENTS

| | | |
|---|---|---|
| 5,201,044 A | 4/1993 | Frey, Jr. et al. |
| 6,122,630 A | 9/2000 | Strickler et al. |
| 6,662,196 B2 | 12/2003 | Holenstein et al. |

(Continued)

*Primary Examiner* — Vincent F Boccio
(74) *Attorney, Agent, or Firm* — Panitch Schwraze Belisario & Nadel LLP

(57) ABSTRACT

A method is provided for performing transaction processing in a system that includes a plurality of nodes. Each of the nodes include a processor, an application executing in the processor, and an instance of a database used by the application. Each node executes transactions. At least two of the nodes are dynamically selected to receive the same request to process a transaction, and the processor at each of the at least two nodes executes and validates the same request to process a transaction. One or more of the at least two nodes replicates the same request, steps and operations, and/or indicia of the transactions to one or more other nodes in the system. The processor at the one or more other nodes locally processes the transaction and compares its results with the replicated steps and operations and/or indicia of the transaction that were received from one of the at least two nodes and executes one or more remediation actions when the result of the comparison indicates that the replicated steps and operations, and/or indicia of the replicated transactions do not match.

12 Claims, 13 Drawing Sheets

Flowchart for a Preferred Embodiment for a Mixed-Mode Active/Active and Validation Architecture Utilizing a Check Integrity Module

(56) References Cited

U.S. PATENT DOCUMENTS

| | | |
|---|---|---|
| 7,103,586 B2 | 9/2006 | Holenstein et al. |
| 9,734,190 B1 | 8/2017 | Holenstein et al. |
| 9,760,598 B1 | 9/2017 | Holenstein et al. |
| 9,922,074 B1 | 3/2018 | Hoffmann et al. |
| 10,095,764 B2 | 10/2018 | Park et al. |
| 10,467,223 B1 | 11/2019 | Holenstein et al. |
| 10,642,826 B1 | 5/2020 | Holenstein et al. |
| 2010/0185847 A1 | 7/2010 | Shasha et al. |
| 2011/0161281 A1* | 6/2011 | Sayyaparaju ....... G06F 16/2379 711/E12.001 |

* cited by examiner

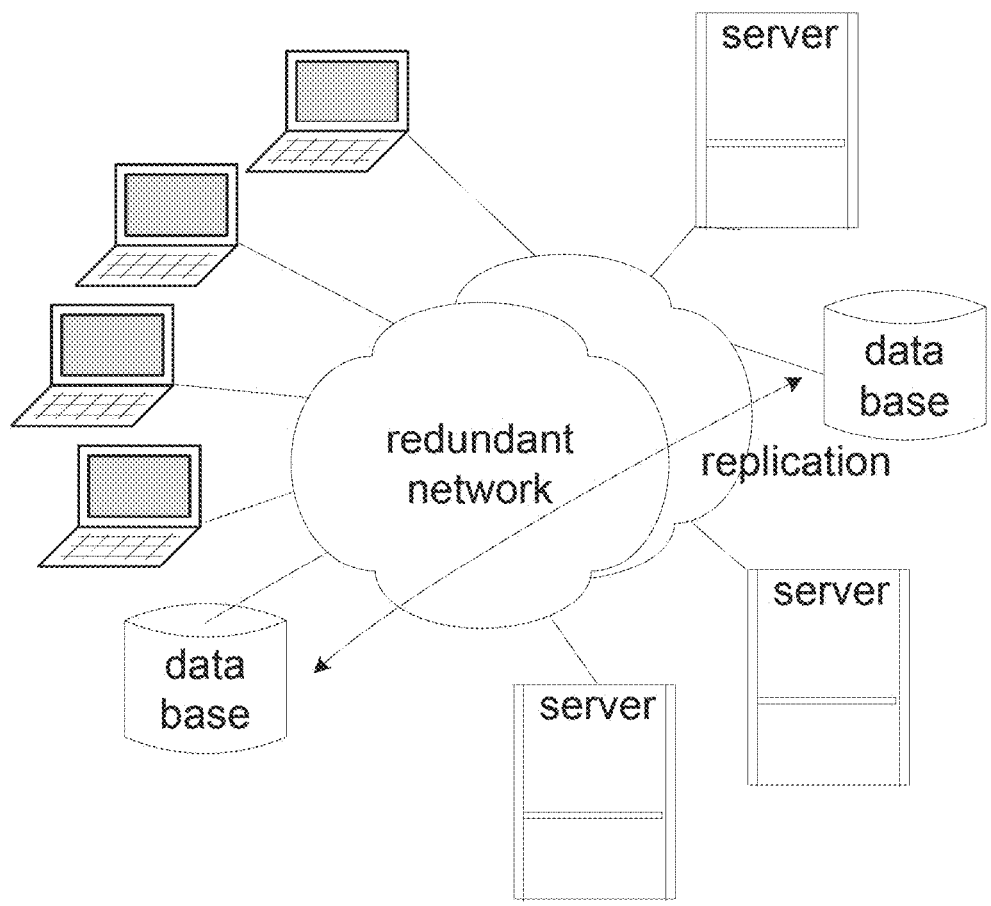
Figure 1: PRIOR ART: An Active/Active System
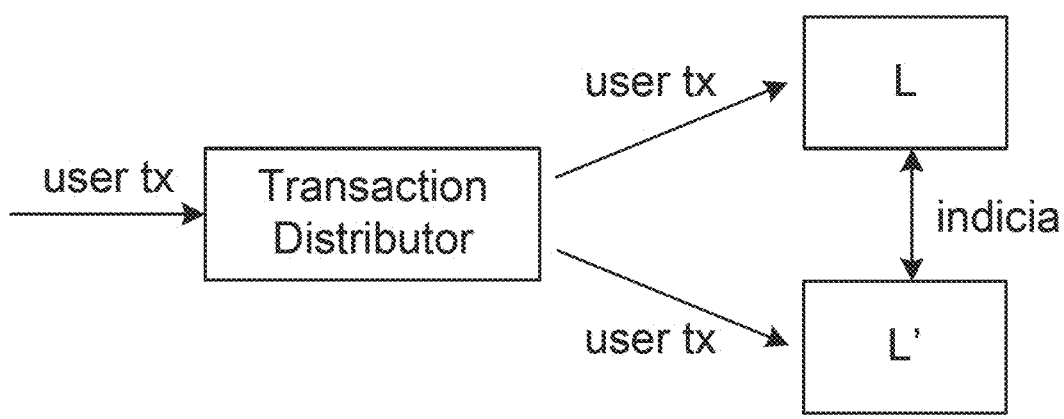
Figure 2: PRIOR ART: Dual Server Reliability Validation Architecture

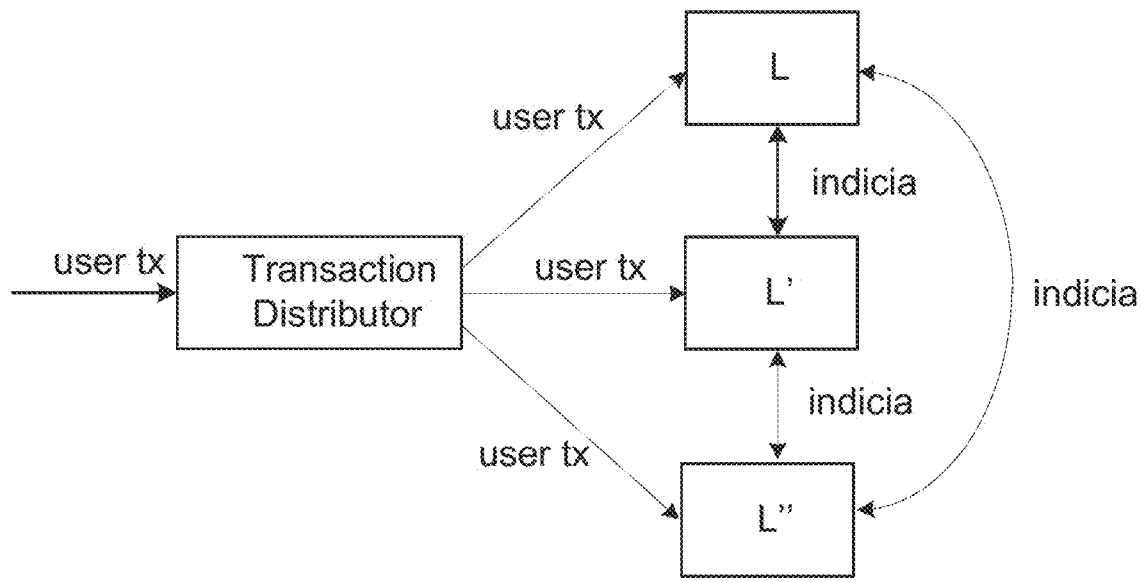
Figure 3: PRIOR ART: Triple Server Reliability Validation Architecture
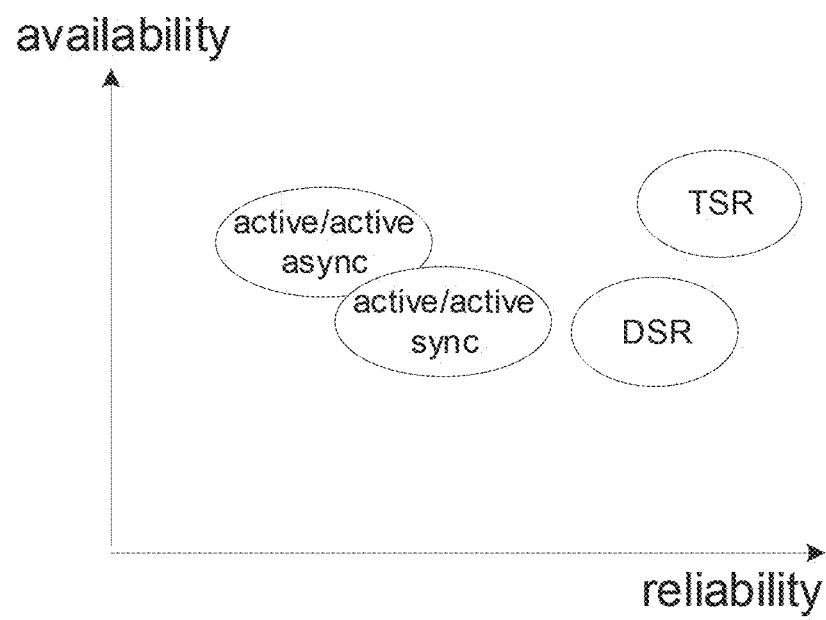
Figure 4: PRIOR ART: Validation Architecture Reliability

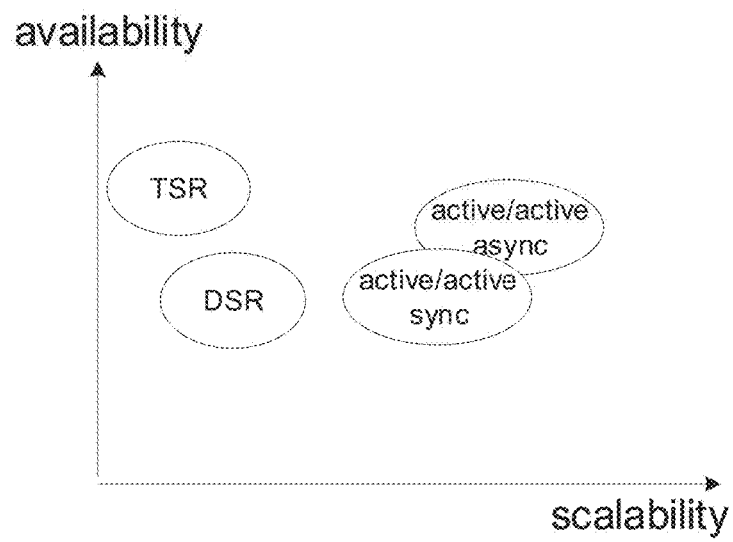
Figure 5: PRIOR ART: Validation Architecture Scalability
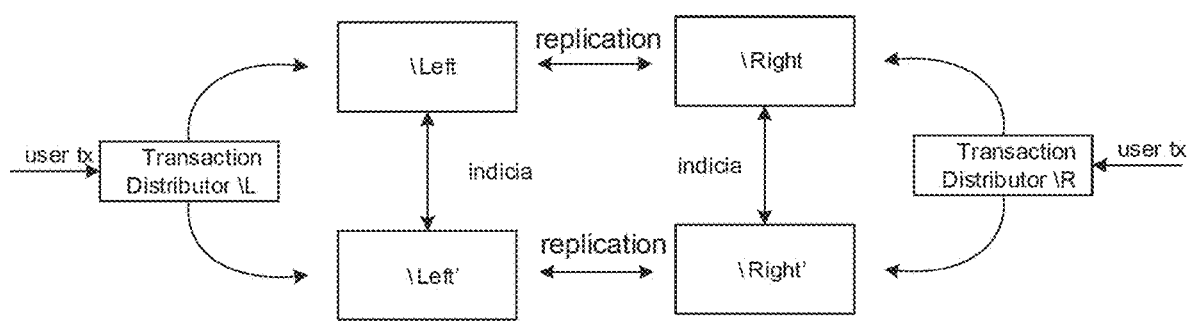
Figure 6: An Active/Active DSR Validation Architecture

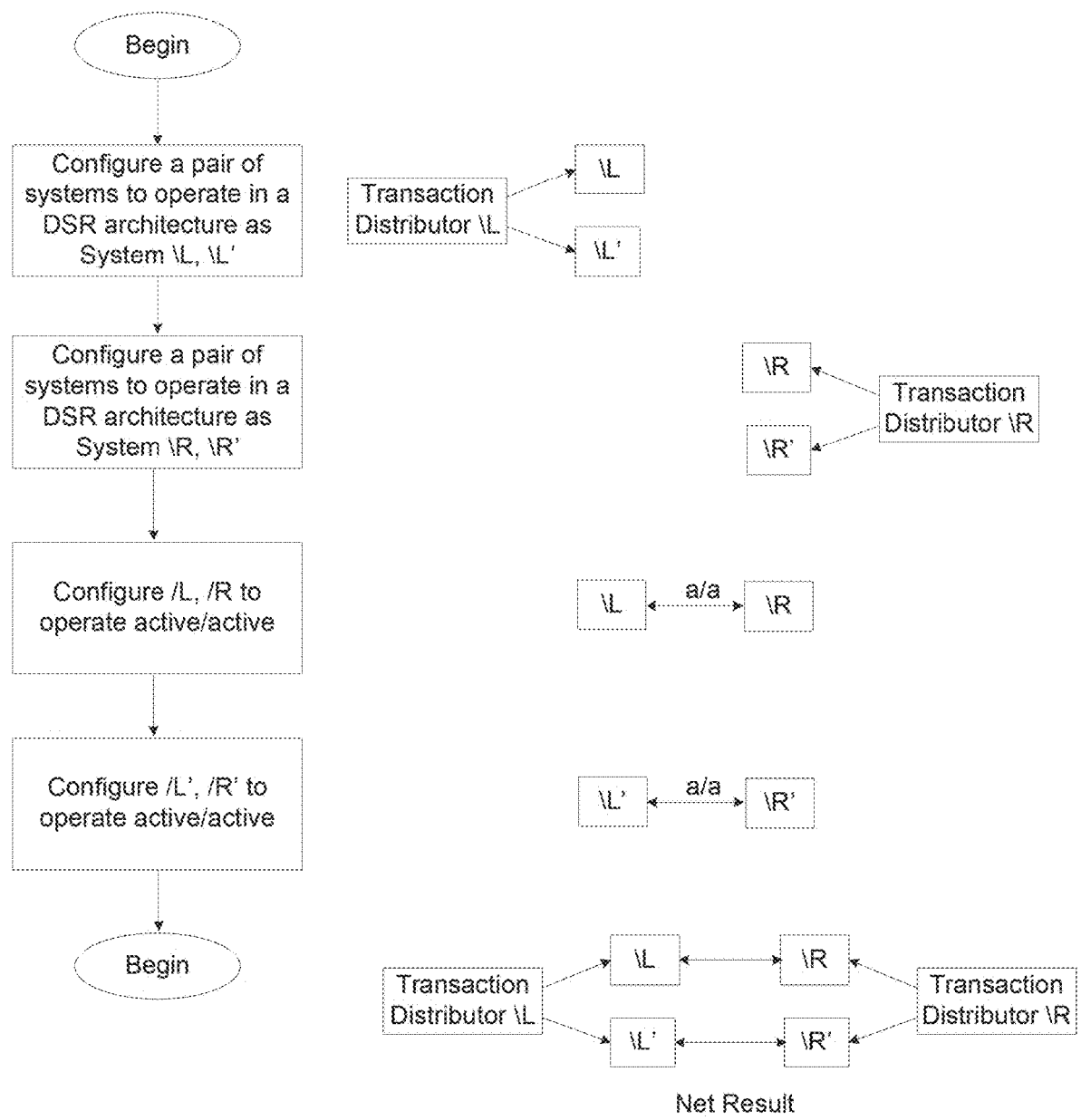
Figure 7: Flow Chart for an Active/Active DSR Validation Architecture

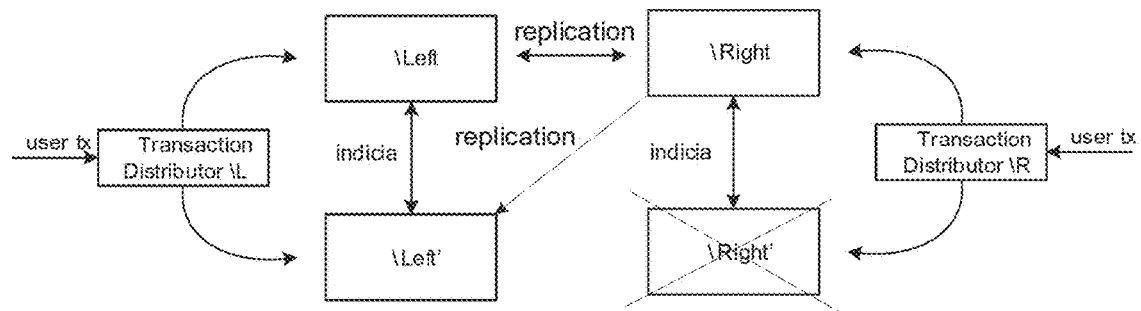
Figure 8: An Active/Active DSR Validation Architecture with a Failure
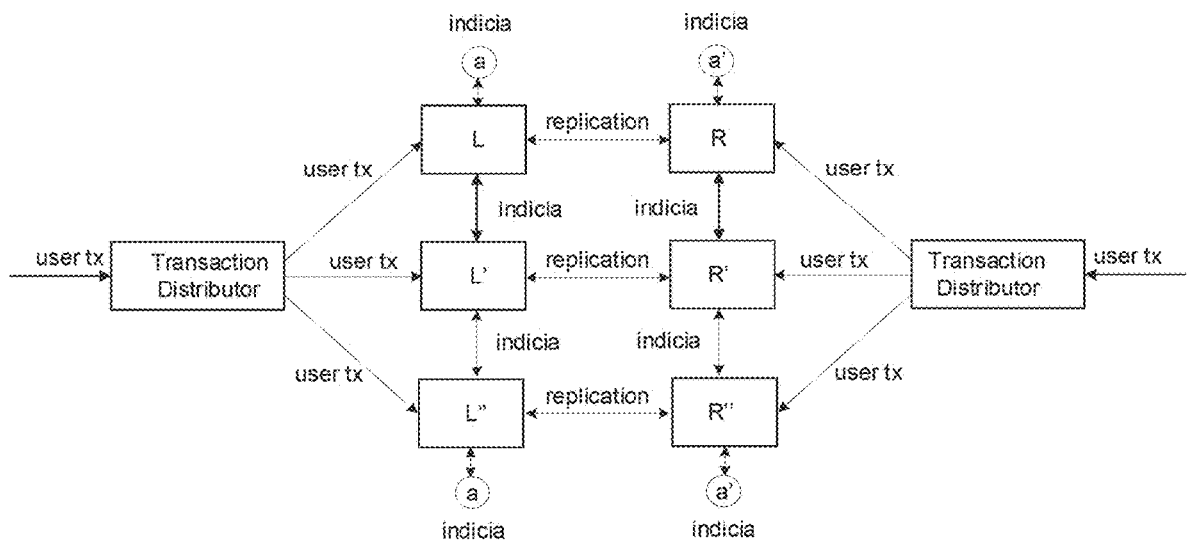
Figure 9: An Active/Active TSR Validation Architecture

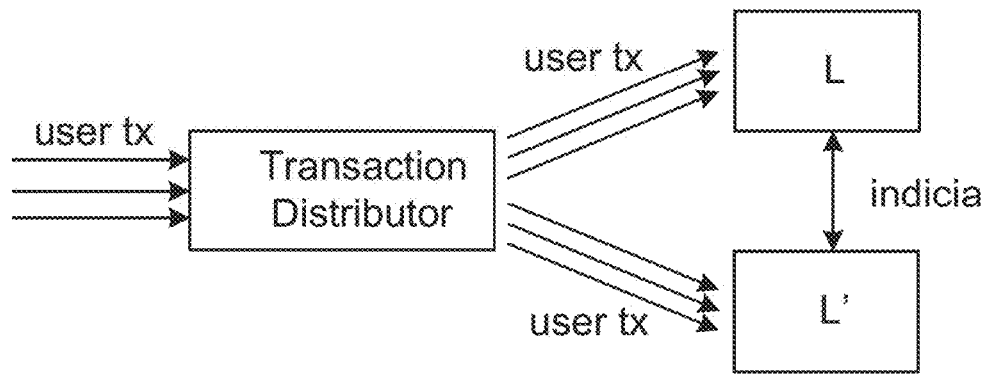
Figure 10: DSR Servicing Multiple User Requests
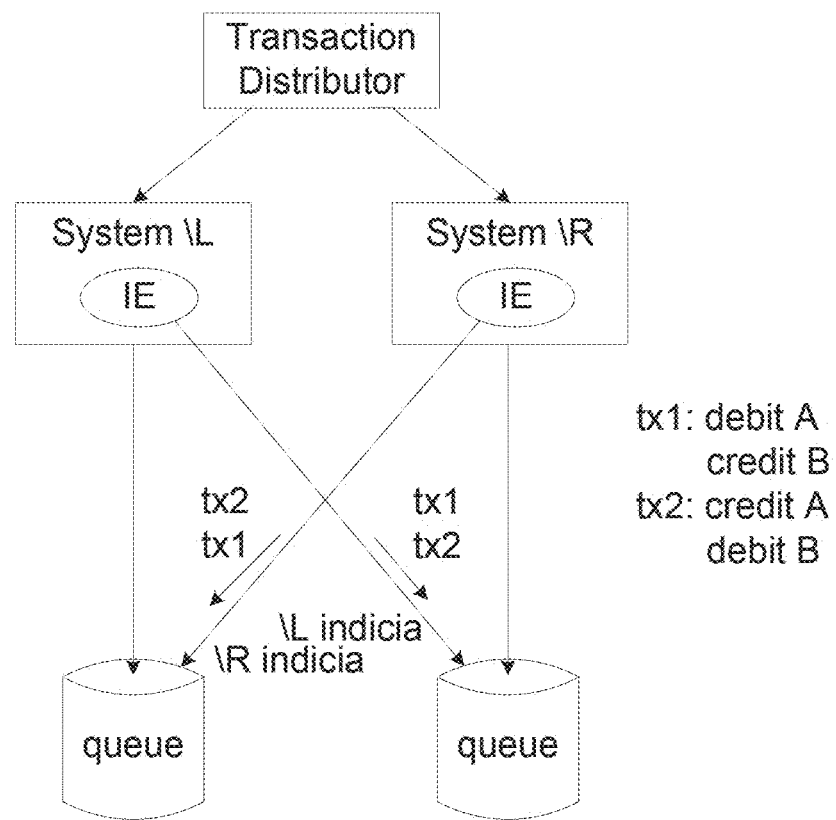
Figure 11: Queueing Out of Order Indicia

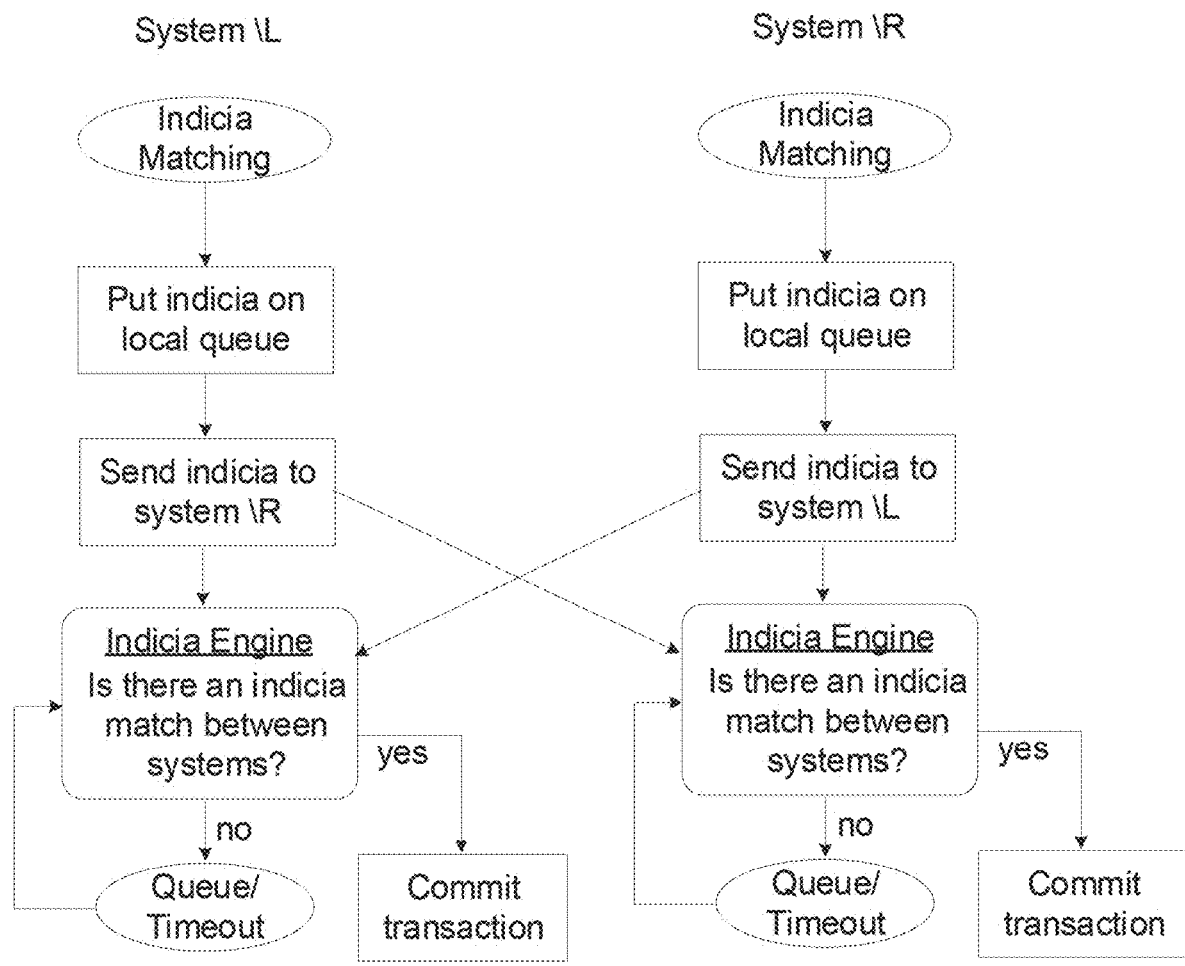
Figure 12: Matching Out of Order Indicia Flow Chart

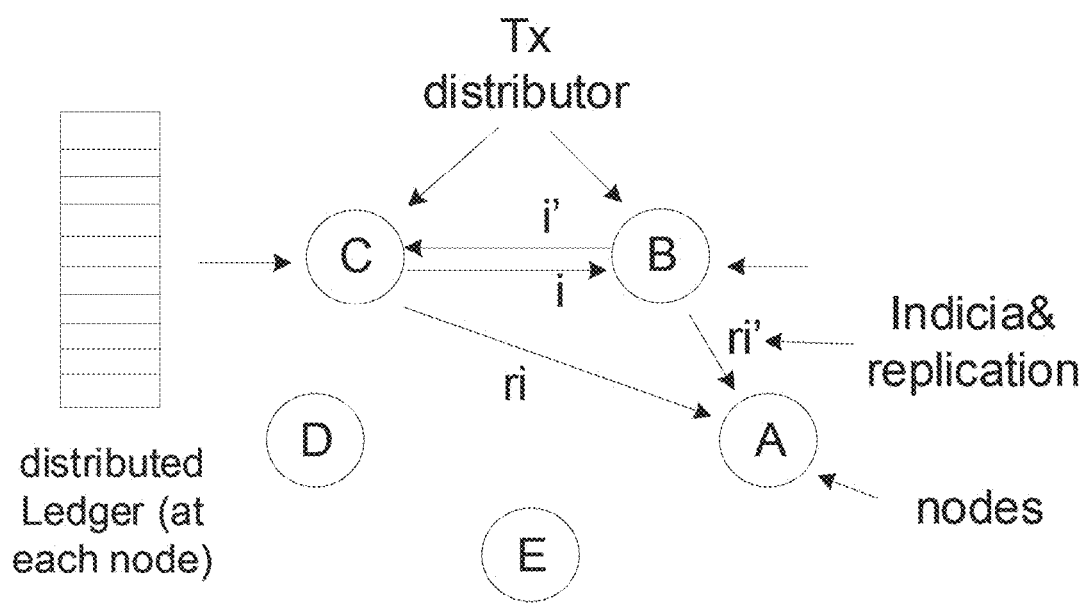
Figure 13: Dynamic Mixed-Mode Active/Active and Validation Architecture

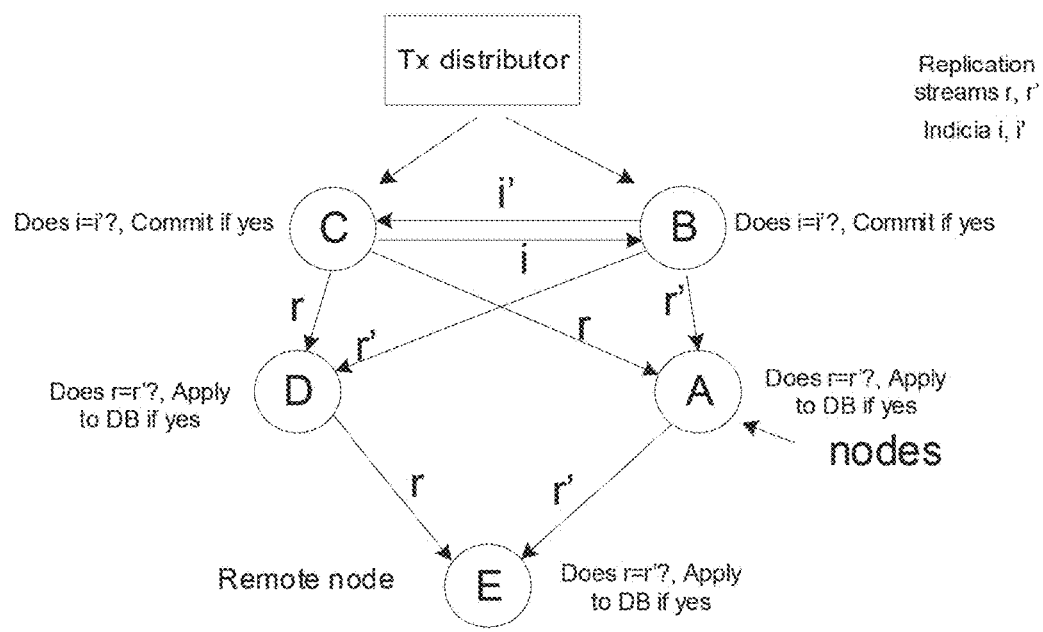
Figure 14: Dynamic Mixed-Mode Active/Active and Validation Architecture (Detail with route-through other nodes)

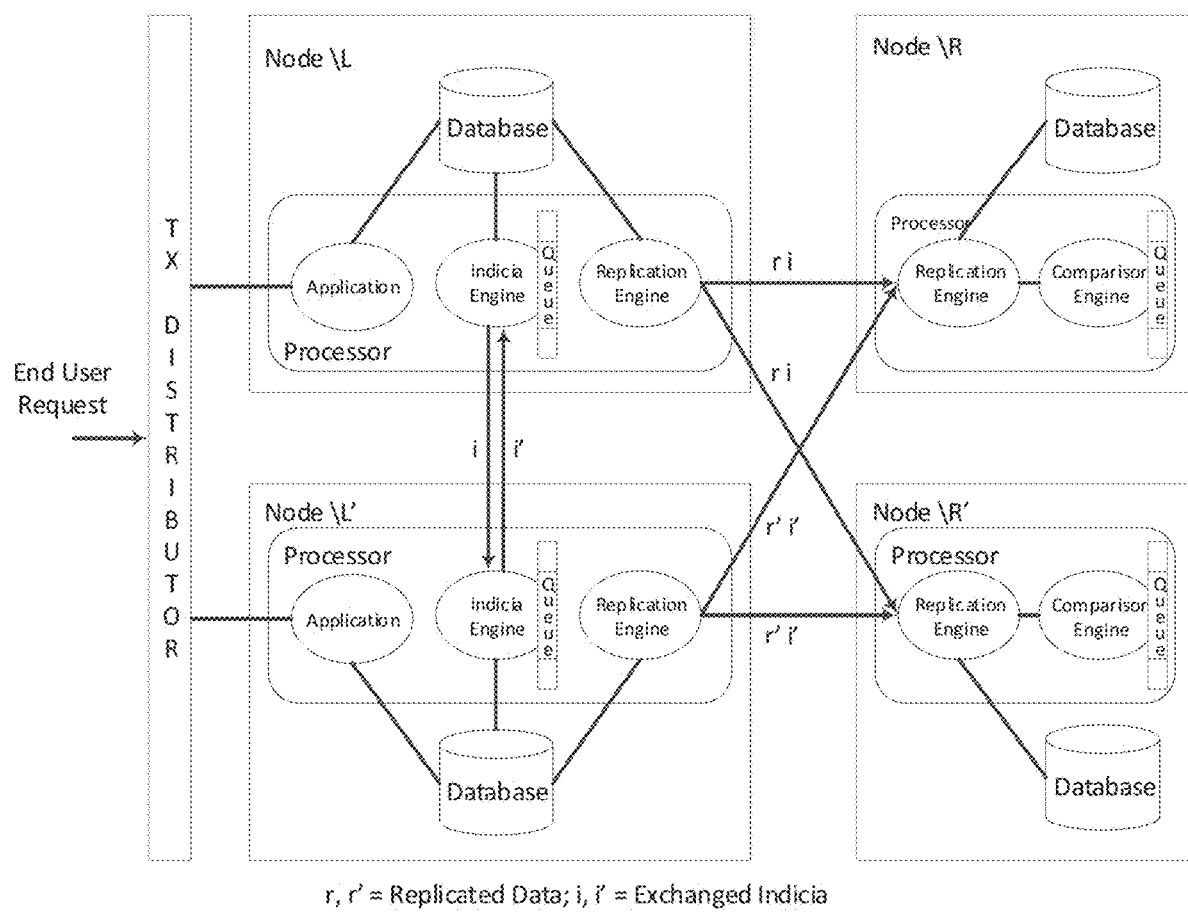
Figure 15: Apparatus for Active/Active and Validation Architecture (Left-Hand Portion)

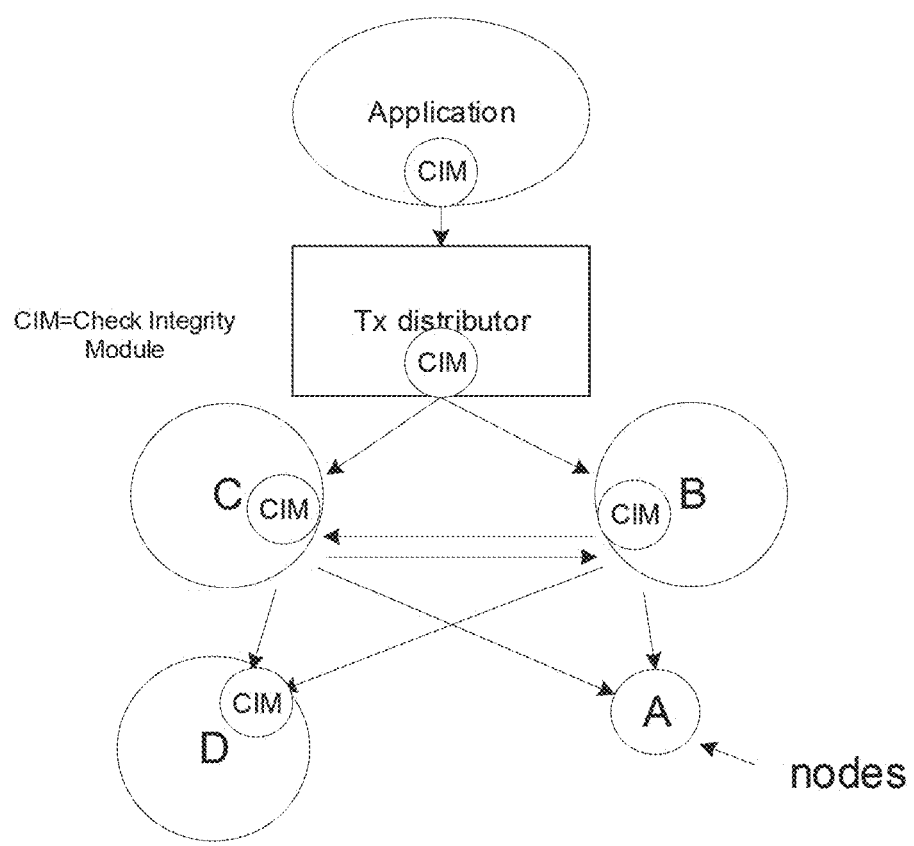
Figure 16: Dynamic Mixed-Mode Active/Active and Validation Architecture Detailing Some Possible Check integrity Module Locations

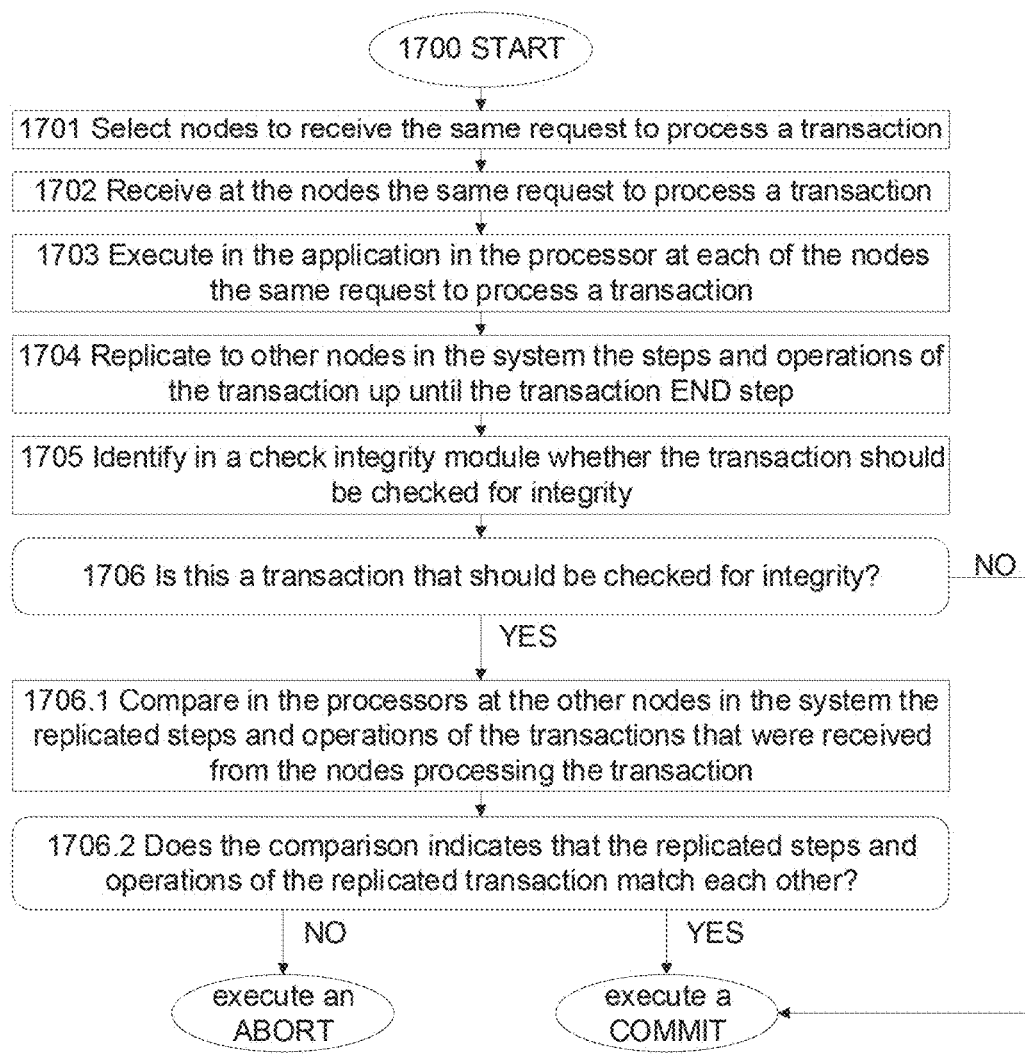
Figure 17: Flowchart for a Preferred Embodiment for a Mixed-Mode Active/Active and Validation Architecture Utilizing a Check Integrity Module

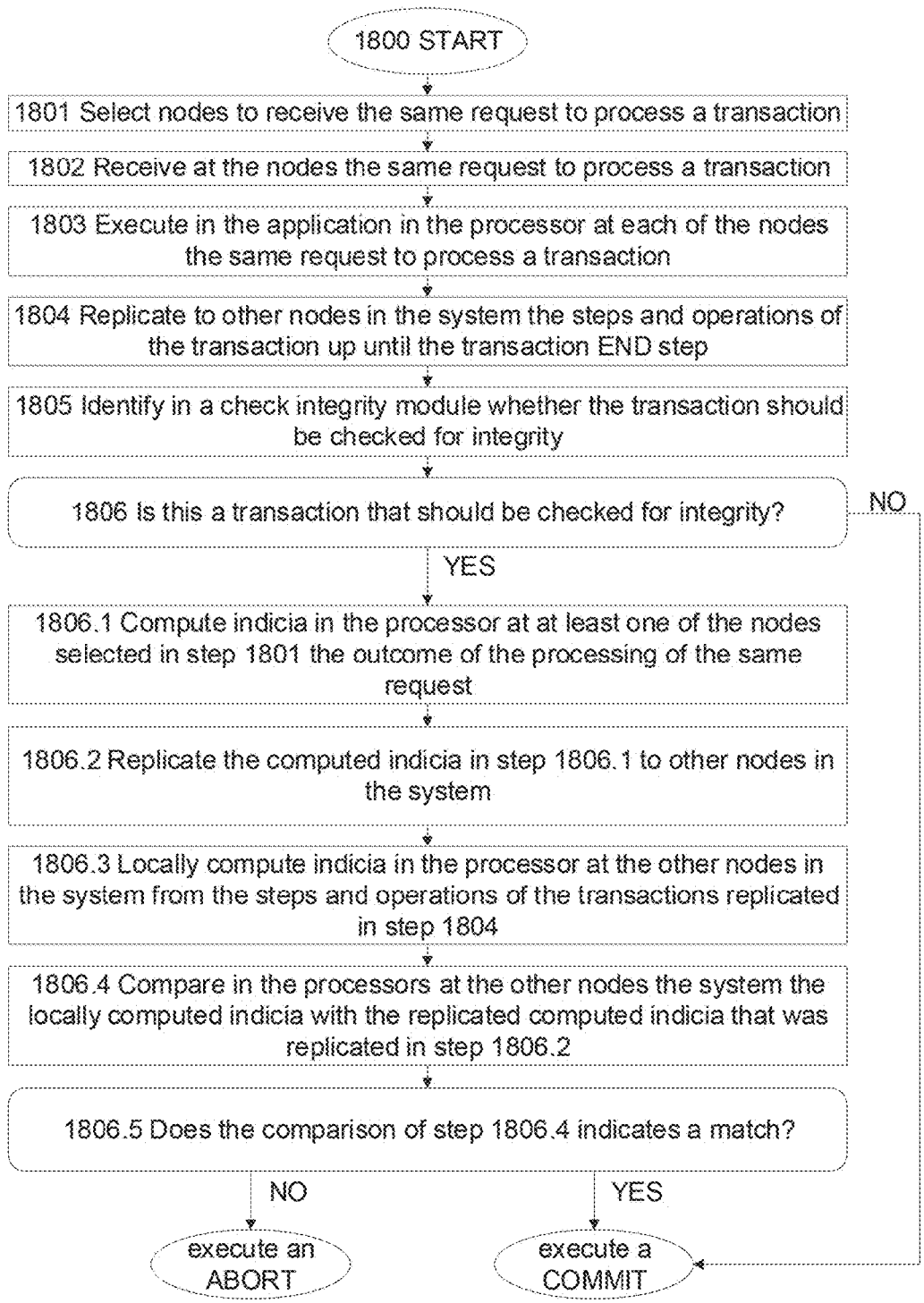
Figure 18: Flowchart for a Preferred Embodiment for a Mixed-Mode Active/Active and Validation Architecture Utilizing a Check Integrity Module and Indicia

DYNAMIC MIXED-MODE METHOD FOR COMBINING ACTIVE/ACTIVE AND VALIDATION ARCHITECTURES FOR DISTRIBUTED LEDGERS

CROSS-REFERENCE TO RELATED APPLICATIONS

This application is a continuation of copending U.S. application Ser. No. 16/560,461 filed Sep. 4, 2019, which, in turn, is a continuation of U.S. application Ser. No. 16/520,904 filed Jul. 24, 2019, now U.S. Pat. No. 10,642,826, which, in turn, is a continuation-in-part of copending U.S. application Ser. No. 16/276,296 filed Feb. 14, 2019. The disclosures of each of these applications are hereby incorporated by reference in their entirety.

This application claims the benefit of U.S. Provisional Patent Application Nos. 62/748,844 filed Oct. 22, 2018, and 62/725,015 filed Aug. 30, 2018, the disclosures of which are both hereby incorporated by reference in their entirety.

BACKGROUND OF THE INVENTION

Certain terms used in the "Background of the Invention" are defined in the section "I. Definitions."

Computer Applications

Much of our daily lives is augmented by computers. The many services upon which we depend, our banking, investing, communications, air and rail travel, online shopping, credit-card and debit-card purchases, mail and package delivery, and electric-power distribution, are all managed by computer applications.

In its simplest form, a computer application is implemented as a computer program running in a computer. A computer program is basically a set of computer-encoded instructions. It often is called an executable because it can be executed by a computer. A computer program running in a computer is called a process, and each process has a unique identifier known to the computer. Many copies of the same (or different) computer program can be running in a computer as separately distinguishable processes. A computer program can utilize multiple processes.

An application typically includes multiple interacting processes.

Application Database

An application often depends upon a database of information that the application maintains to record its current state. Frequently, the information in the database is fundamental to the operation of the application, to the decisions it makes, and to its delivery of services to the end users.

The database may be stored in persistent storage such as a disk for durability, it may be stored in high-speed memory for performance, or it may use a combination of these storage techniques. The database may be resident in the same computer as the application program, it may be resident in another computer, it may be implemented as an independent system, or it may be distributed among many systems.

A database generally includes one or more files or tables. Each file or table typically represents an entity set such as "employees" or "credit cards." A file is comprised of records, each depicting an entity-set member such as an employee. A table is comprised of rows that define members of an entity set. A record is comprised of fields that describe entity-set attributes, such as salary. A row is comprised of columns that depict attributes of the entity set. In this specification, "files" are equivalent to "tables;" "records" are equivalent to "rows;" and "fields" are equivalent to "columns."

Requests

End users generate requests to be processed by the computer application. End users may be people, other computer applications, other computer systems, or electronic devices such as electric power meters. In this specification, the term "end user" means any entity that can influence an application and/or can request or use the services that the application provides.

An example of a request from an end user is a request for a bank-account balance. Another example is an alert that a circuit breaker in a power substation has just tripped. In some cases, a computer application may on its own internally generate events for interfacing with itself or other applications (and thus be its own end user).

Request Processing

The application receives a request from an end user. As part of the processing of this request, the application may make certain modifications to its database.

The application can read the contents of its database. As part of the application's processing of the request, it may read certain information from its database to make decisions. Based on the request received from its incoming end user and the data in its database, the application delivers certain services to its outgoing end users.

Services

A service may be delivered by an application program to process requests as the result of a specific input from an end user, such as providing an account balance in response to an online banking query. Another example of a service is the generation of a report upon a request from an end user.

Alternatively, the application program may deliver a service spontaneously, either on a timed basis or when certain conditions occur. For instance, a report may be generated periodically.

The end users providing the input to the application may or may not be the same end users as those that receive its services.

Transactions

The services provided by the application typically are processed as transactions. Each transaction will have a beginning point (for example, when a transaction is started), and an end point (for example, when the transaction completes, either successfully or unsuccessfully). A successful transaction is referred to as one that commits (completes successfully) or is committed. Its effects remain after the transaction ends. An unsuccessful transaction is referred to as one that aborts or has been aborted, and its effects are removed and reset to the original state of the application environment.

The transaction thereby groups the associated operations, functions, data changes, etc., into a logical set of processing functions and changes that are either all applied (committed) or all removed (aborted) depending on the ultimate status of that transaction.

Hence transactions typically follow the ACID properties—atomicity, consistency, isolation, and durability.

RAS—Reliability, Availability, and Scalability

The purpose of the variety of processing architectures in use today is to enhance the attributes known as RAS—Reliability, Availability, and Scalability. By reliability, we mean data integrity. The data in databases must remain correct and consistent. Any transaction applied to the database typically must leave it in a correct, consistent state.

Availability means that the system is always ready for use by the end users. A typical server has an availability of four 9s. This means that it will be down approximately 50 minutes per year. System availability can be enhanced significantly by running a pair of servers in an active/active configuration (described later). Typical availabilities for active/active systems are about six 9s, which equates to about 30 seconds per year of downtime.

Scalability is the capacity to add resources to handle additional transaction loads. When the loads decrease, the additional processing resources are typically released.

Active/Active Architecture Systems

Background for active/active architecture systems ("Active/Active Systems") is described in Volume 2 of the book series "Breaking the Availability Barrier (Breaking the Availability Barrier II. Achieving Century Uptimes with Active/Active Systems, AuthorHouse; 2007), and in U.S. Pat. No. 6,662,196 (Holenstein et al.) and U.S. Pat. No. 7,103,586 (Holenstein et al.). An active/active system, shown in FIG. 1, is comprised of two or more independent systems in a redundant application network that are cooperating in a common application. A transaction can be sent to any system in the network to be properly processed. The systems are independently processing different transactions. Changes made to the database of one system by a transaction are replicated to the databases of the other systems in the application network to keep the databases synchronized.

All capacity is available for use. Only a portion of the users are affected should a node in the system fail. Their transactions can be simply rerouted to a surviving node (system). Thus, recovery from a failure is measured in subseconds or seconds.

Validation Architecture Systems

The validation architecture system shown in FIG. 2, and described further in U.S. Pat. No. 9,734,190 (Holenstein et al.) and U.S. Pat. No. 9,922,074 (Hoffmann et al.), also incorporates two systems. However, in this case, each system is processing the same transaction. A Transaction Distributor sends the request to process a transaction to both systems. Each system calculates an indicium of some sort representing the result of its processing. For instance, the indicium could be a unique hash of the changes made by the system to its database.

The indicia calculated by the two systems are compared by each system. If they match, the transaction is committed. If they don't match, the transaction is aborted (or in some embodiments only an alert or error message are issued, or one or more systems are shutdown, or other remediation action is taken). In this context, "match" may be an identical match, but it can also encompass forms of fuzzy or intelligent inexact matching. One example of fuzzy matching is if the two systems use different rounding algorithms on a calculation or have different floating point implementations. The inexact match could then consist of a tolerance such as the match is accepted if the difference is within one thousandth of a percent. Fuzzy matching could also involve utilizing only a subset of the columns affected in the transaction.

The benefit of a validation architecture is that it detects all single-system errors, and many multiple-system errors, such as hardware/software failures or malware.

The architecture shown in FIG. 2 is a Dual Server Reliability (DSR) configuration. A Triple Server Reliability (TSR) configuration is shown in FIG. 3. All systems process the same transaction, and their indicia are compared. If all indicia match, the transaction is committed. If only two indicia match, the transaction is committed on those two systems; and the third system can be taken out of service or have corrective action taken. An error indication can be posted for manual resolution of the problem if necessary.

Comparing the Two Architectures

A comparison of active/active systems and validation architectures is shown in Table 1 and FIG. 4 and FIG. 5. As shown in FIG. 4, an active/active system has high data availability, but a corruption in the database may go undetected and will be replicated to the other databases in the application network impacting data reliability. Replication may be synchronous or asynchronous.

In the case of a validation architecture, data availability is also high but no single hardware failure, software error, malware, or operator error can affect the data integrity (reliability) of the system unknown to the owner as the indicia of the two systems will no longer match. In this case, corrective action must be taken on the validation architecture system such as taking one or more nodes of the system out of service to be repaired.

Comparing availability, a node failure in an async active/active system may allow the system to continue operating with just the surviving systems, though with lower capacity. But, in the case of a DSR validation architecture, the result of a node outage is either 0% capacity or 100% capacity depending upon the decision to continue processing with one node or not.

As shown in FIG. 5, active/active systems are scalable—the more nodes in the system, the more capacity to process transactions. A validation architecture is not readily scalable. It has the capacity of a single node.

Active/active systems are ideal for use in private data centers. The validation architecture is ideal in untrusted or unreliable environments such as public clouds.

TABLE 1

A Comparison of Active/Active and Validation Architectures

| | Reliability | Availability | Scalability | Usage |
|---|---|---|---|---|
| Active/Active Architecture | 1. Single System Integrity 2. Hypothetical: Hardware - six 9s Software - five 9s | 1. Node outage 50% of users affected 2. User Switchover - five 9s | Multiple nodes processing different transactions | Ideal in corporate data centers where availability and scalability are critical |
| Validation Architecture | No single hardware, software, malware, operator error, etc. can affect integrity unknown to system owner | 1. DSR-Node outage is either 0% or 100% (continuous processing or do not continue) | 1. 100% of a single node 2. No scalability for more nodes | 1.Ideal in untrusted or unreliable environments, (no control of hardware) |

TABLE 1-continued

A Comparison of Active/Active and Validation Architectures

| Reliability | Availability | Scalability | Usage |
|---|---|---|---|
| | 2. TSR - continuous processing | | 2. For high value transactions (like in banking) |

What is Needed

What is needed is a system and method that combines the best features of Active/Active and DSR/TSR Validation Architectures into a mixed-mode architecture that optimizes application reliability, availability, and scalability.

As discussed above, Active/Active and Validation Architectures are both prior art methods. Combining the technologies in novel ways is needed to maximize RAS and is the basis of preferred embodiments of the present invention.

SUMMARY OF THE INVENTION

Preferred embodiments of the present invention combine the Active/Active Architecture with the Validation Architecture to achieve the benefits of both. Two or more validation architecture systems are configured, and a transaction may be sent to any of them and be processed correctly. The changes made to the database by the validation architecture systems are replicated to the other validation architecture systems via Active/Active replication to keep the databases synchronized.

BRIEF DESCRIPTION OF THE DRAWINGS

Preferred embodiments of the present invention will now be described by way of example with reference to the accompanying drawings:

FIG. 1 shows a prior art Active/Active System architecture.

FIG. 2 shows a prior art Dual Server Reliability (DSR) Validation architecture.

FIG. 3 shows a prior art Triple Server Reliability (TSR) Validation architecture.

FIG. 4 shows a prior art description of Validation Architecture availability as a function of reliability.

FIG. 5 shows a prior art description of Validation Architecture availability as a function of scalability.

FIG. 6 shows a combined Active/Active and DSR Validation architecture in accordance with a preferred embodiment of the present invention.

FIG. 7 shows a flow chart for a combined Active/Active and DSR Validation architecture in accordance with a preferred embodiment of the present invention.

FIG. 8 shows an Active/Active DSR Validation architecture with a failure of one of the nodes (\Right') depicted, in accordance with a preferred embodiment of the present invention.

FIG. 9 shows a combined Active/Active and TSR Validation Architecture in accordance with a preferred embodiment of the present invention.

FIG. 10 depicts a DSR system servicing multiple user requests from users in accordance with a preferred embodiment of the present invention.

FIG. 11 depicts a DSR system queueing out-of-order indicia in accordance with a preferred embodiment of the present invention.

FIG. 12 shows a flow chart for matching out-of-order indicia in a DSR system in accordance with a preferred embodiment of the present invention.

FIG. 13 shows a Dynamic Mixed-Mode Active/Active and Validation Architecture system in accordance with a preferred embodiment of the present invention where nodes C and B were dynamically picked to service a request from the transaction distributor and node A is receiving indicia and replication data from both of nodes B and C to be compared at node A.

FIG. 14 shows additional Dynamic Mixed-Mode Active/Active and Validation Architecture details with route-through of traffic via other intermediary nodes (A and D) depicted to node E, in accordance with a preferred embodiment of the present invention FIG. 15 depicts the left-hand portion of an apparatus combining Active/Active and Validation architectures in accordance with a preferred embodiment of the present invention. Nodes \L and \L' are servicing the transaction distributor requests in a validation architecture. Nodes \R and \R' are acting as the active-active partners of the nodes on the left.

FIG. 16 shows some of the possible locations where a Check Integrity Module could be located.

FIG. 17 shows a flowchart for a Mixed-Mode Active/Active and Validation Architecture embodiment which utilizes a Check Integrity Module and comparison of replicated steps or operations.

FIG. 18 shows a flowchart for a Mixed-Mode Active/Active and Validation Architecture embodiment which utilizes a Check Integrity Module and comparison of indicia.

DETAILED DESCRIPTION OF THE INVENTION

Certain terminology is used herein for convenience only and is not to be taken as a limitation on the present invention. The words "a" and "an", as used in the claims and in the corresponding portions of the specification, mean "at least one."

I. Definitions

The following definitions describe the use of certain terms in this specification. They are hierarchically ordered in that each definition builds on previous definitions. Unless otherwise indicated, these definitions apply whether or not the term used in the disclosure is capitalized or not.

Table—A set of data values for a relational database that is organized using a model of horizontal rows and vertical columns. The columns are identified by name, and the rows can be uniquely identified by the values appearing in a particular column subset (the table's primary key). A table usually characterizes an entity set. Each row in the table describes an instance of the entity set. Each column describes an attribute of the entity set.

File—The equivalent of a table for nonrelational databases. A file is made up of records, and each record describes an entity instance. A record is made up of fields, each of which describes an attribute of the entity set. In this specification, the term "table" or "file" is to be interpreted as "table and/or file."

Column—A table component that typically holds a single attribute, such as SALARY, of the entity set.

Field—A file component that typically holds a single attribute, such as SALARY, of the entity set. In this specification, the term "column" or "field" is to be interpreted as "column and/or field."

Row—A table component that represents an entity instance. It is a sequence of {column name, value} pairs usually implemented as a sequence of values positioned according to their corresponding column names. For instance, (EMPLOYEE NUMBER, 235), (NAME, Joe Smith), (DEPARTMENT, Accounting), (SALARY, $30,000).

Record—The same as a row, but "row" is usually used for relational databases; and "record" is usually used for file systems. In this specification, the term "row" or "record" is to be interpreted as "row and/or record."

Database—A collection of related tables or files.

Insert—The addition of a row into a database.

Update—The modification of a row in a database.

Delete—The logical or physical removal of a row from a database.

Change—An insert, update, or delete.

Function—A logical implementation of a task or service.

Program—An executable set of programming code for providing a specific function or set of functions.

Executable—A program.

System—A set of one or more nodes that work together to execute an application. A system might consist of multiple sub-systems.

Computer—A processor with memory and input/output devices that can execute a program.

Node—One or more devices, such as a computer or cluster, on a network.

Process—A program running in a computer. A process provides one or more functions. One program can be spawned as multiple distinguishable processes, and/or utilize multiple processes.

Application—One or more processes cooperating to perform one or more useful functions, or services, for end users.

Transaction—a transaction is the result of a specific type of request or requests that the application processes to provide a service. The transaction groups the various services needed to satisfy the request into a logical set of functions, operations, and/or processing to complete or satisfy the request (e.g., one or more data manipulation language (DML) or data definition language (DDL) operations). The transaction typically has a begin point (e.g., BEGIN step) and an end point (e.g., END step which is either a COMMIT or an ABORT). In most common commercial application environments, the transaction either will be fully implemented, or all effects of it will be removed, should the transaction fail or not be able to be completed for any reason.

Audited Transaction—A delimited set of database operations (inserts, updates, deletes, reads, create tables, and/or purge tables, etc.) that are either all made or none are made. An audited transaction is guaranteed to leave the database in a consistent state, and its results are typically guaranteed to survive system failures.

Unaudited Transaction—A database change or group of changes that is not audited. It has no explicit begin or end delimiter, though there may be logical boundaries. An unaudited transaction is not guaranteed to leave the database in a consistent state, and its results are typically not guaranteed to survive system failures.

ACID Properties—Audited transactions generally maintain the ACID properties of atomicity, consistency, isolation, and durability. Atomicity means that either all operations contained within the transaction are executed against the database or that none are. Consistency means that at any time, the view of the database represents an accurate view of the application data. Isolation means that a transaction is unaffected by other transactions that are executing simultaneously. Durability means that the resulting modification to the database by a transaction will survive any subsequent system failures. In some implementations, the ACID properties may be relaxed.

Atomicity—See ACID Properties.

Begin Transaction—A directive that indicates the beginning of an audited transaction. A begin transaction directive may be explicit, or it may be implicit such as with the first database operation for a transaction.

Begin Work—Equivalent to Begin Transaction.

Commit Transaction—A directive that indicates an audited transaction has completed successfully. The directive may be implicit with database that, for example, commit on disconnect or for single row updates.

Commit Work—Equivalent to Commit Transaction.

Abort Transaction—A directive that indicates an audited transaction has been unsuccessful and should be undone.

Rollback Work—Equivalent to Abort Transaction.

Uncompleted Transaction—A transaction that has begun but has been neither committed nor aborted.

Operating System—A software facility that manages computer hardware resources and provides common services for application processes. Services include time functions, reading and writing interprocess messages, and database manipulation.

End Users (also "Users")—People, systems, devices, applications, or any other entity that can influence an application or can request or use the services that it provides.

Active/Backup Architecture—A redundant system architecture in which an active production system is backed up by a passive system that may or may not be doing other work. Should the active system fail, the backup system is brought into service; and the application continues running on the backup system. Failover from a failed active system to the backup system can take some time, ranging from minutes to hours. Furthermore, the failover may not work (a failover fault). For instance, if the backup applications have not been kept up to date and synchronized with the active system, a failover will result in divergent processing.

Active/Active Architecture—A redundant system architecture in which two or more computing systems are actively processing transactions for the same application. Should one system fail, recovery only entails sending further transactions to the surviving system(s). Failover typically can be accomplished in seconds, and there are no failover faults (the surviving systems are known to be working as they are all processing transactions for the same application).

Indicium, and its plural Indicia—A representation of the changes that an application is going to make to the database (typically, values provided in the transaction request), or the results of the changes that were made, but perhaps not committed yet, to the database (typically, database transaction "after" values). For instance, an indicium may be a unique hash or checksum of the changes, or it might be the complete set of changes. In some cases, multiple indicium are computed, exchanged, and compared in the validation Architecture configuration for each transaction request. Herein this disclosure, Indicia and Indicium are used interchangeably and do not necessarily indicate the number of indicium involved in the applicable case.

Validation Architecture—A redundant system architecture in which two or more computing systems are actively processing the same transaction. Each system calculates an indicium representing the changes that it will make, or made, to the database. If the two indicia compare, the transaction is committed. Otherwise, the transaction is aborted and an error is reported or in some embodiments only an alert or error message are issued, or one or more systems are shutdown, or other remediation action is taken such as:
  (i) issuing a database rollback on one of the systems,
  (ii) executing self-diagnostics on one of the systems,
  (iii) ignoring the issue, for example, if it will be repaired in a subsequent transaction,
  (iv) taking one of the systems or its application offline,
  (v) aborting the transaction executing on a subset of the systems (if more than two systems are in use), and
  (vi) resynchronizing the database at one or more systems.

Redundant Architecture—A system architecture that consists of two or more nodes that are operating in a way to increase the overall availability of the application to end users. Active/Backup and Active/Active Architectures are the two primary redundant system architectures.

Sizzling-Hot Takeover (SZT) Architecture—An active/active architecture in which only one computing system is processing transactions. A SZT system avoids the problems (such as failover problems) that an application might face if run in a distributed environment, but it has the fast and reliable failover characteristics of an active/active system.

Backup—Creating a copy of a database to protect it from loss.

Online Backup—Creating a copy of an active database to protect it from loss.

Restore—Restoring a database in a consistent state by loading a backup copy and rolling forward changes that occurred to the backup copy once the backup was started but before it was completed.

Virtual Tape—Magnetic tape images on a disk, which may be remote from the source system.

Check—A document showing a transaction transferring funds from a payer to a payee.

Credit-Card Statement—A report showing all of the credit-card transaction charges made to a particular credit card during a specified time period.

Debit-Card Statement—A report showing all of the debit-card transaction charges made to a particular debit card during a specified time period.

Bank Statement—A statement showing all of the transaction deposits, withdrawals, and cleared checks from a user's bank for a specified time period.

ATM Receipt—A receipt showing the transaction date and amount of an ATM withdrawal.

POS Receipt—A receipt showing the details of a transaction point-of-sale purchase, including each item purchased and the amount paid for that item.

Consistent Database—A database is consistent if its data is valid according to all defined rules. For instance, a parent row must exist for every child row that refers to it.

Record-Oriented Database—A database that is accessed by specifying a key pointing to one or more records.

Field-Oriented Database—A database that is accessed by specifying a key pointing to a field.

Row-Oriented Database—A database that is accessed by specifying a key pointing to one or more rows.

Column-Oriented Database—A database that is accessed by specifying a key pointing to a column.

II. Detailed Description

The disclosure which follows is for a system and method that combines the best features of Active/Active and DSR/TSR validation architectures into a mixed-mode architecture that optimizes application reliability, availability, and scalability.

An active/active DSR validation architecture is shown in FIG. 6. It comprises two validation architecture systems, \Left, \Left' (\L, \L'), and \Right, \Right' (OR, \R'). A request to process a transaction can be submitted either to the \L, \L' validation architecture subsystem via the Transaction Distributor \L or to the \R, \R' validation architecture subsystem via the Transaction Distributor \R. As the transaction is being processed, the validation architecture subsystem performing the processing replicates the changes that it had made to its database to the other validation architecture subsystem to keep the two databases synchronized, as in an active/active architecture. A flow chart for this process is shown in FIG. 7.

If a Validation Architecture System in the active/active network should fail, as shown in FIG. 8, replication is switched to keep the other subsystem synchronized if changes (i.e. inserts, updates, and deletes) are still flowing to the part of the Validation Architecture System that didn't fail. Alternatively, all users could be switched to the side (\L or \R) that is still fully functional. In the case, where there are users which are simply reading data (i.e. no database changes) they may elect to read from the surviving part of the failed Validation Architecture System (i.e. \R in FIG. 8) as it can be still being kept current via Active/Active replication from its counterpart (i.e. \L in FIG. 8).

An active/active TSR validation architecture is shown in FIG. 9. Again, a transaction can be routed to any one of the triple validation architecture subsystems. Once the transaction is processed, the validation architecture subsystem performing the processing replicates the changes made to its database to the other validation architecture subsystems to keep them synchronized as in an active/active architecture.

Though FIG. 6 through FIG. 8 show only two validation architecture sets in the active/active system, more may be included as shown in FIG. 9. Changes made to one database are replicated to all of the other databases. In this way, the validation architecture in an active/active configuration can be scaled to accommodate any transaction load.

One problem in real-world implementations is represented by FIG. 10. User requests do not simply arrive one at a time. Rather, multiple user requests are being processed simultaneously by the system, and they are not arriving in the same order. Therefore, any single indicium is not identified easily with a particular user request.

In order for indicia matching to work, each indicium has to be associated with a particular end user request. Only in this way can the processing of a user transaction be aborted if the indicia do not match. However, the user requests are being processed in different orders by the two systems since the user requests are not arriving in the same order. Therefore, a means is provided to maintain a queue of indicia from one subsystem and to look up the corresponding indicia arriving from the other subsystem. In this way, the two subsystem's indicia corresponding to a particular user request can be matched to ensure that they agree in order for the transaction to be committed.

1. An Indicia Ordering Issue

The two subsystems of a Validation Architecture calculate indicia representing the changes the subsystems are making to the database as show in FIG. 11. However, the indicia cannot always be counted on to be processed in the same order on the subsystems. Therefore, as shown in the figure, queueing of out of order indicia is often required to ensure that later matching can be carried out. In this case, As shown in as shown in FIG. 11 and the flow chart of FIG. 12, System \L puts its indicia in a local queue and sends its indicia to System \R. System \R may check to see if the indicia for System \L is already present, if not, it will locally queue and periodically recheck that indicia up to a specified timeout. Likewise, System \R operates in an analogous fashion.

The Indicia Engine looks for matches between indicia generated on its local system and provided by the remote system. How are the indicia values matched? One way is to assign a transaction tag (such as the name of the transaction) to the indicia, as shown in Table 2. Another way is to match on the indicia itself

TABLE 2

Matching Out of Order Indicia

| System | Tag Tx ID | Indicia | Indicia Match ? |
|---|---|---|---|
| \L | 123 | ABXQZ | YES! |
| \R | 123 | ABXQZ | |
| \L | 222 | BBABC | Not Yet |
| \L | 665 | CCXQZ | NO! |
| \R | 665 | WWAAZ | |
| \R | 132 | AAA | Not Yet |

If a match of the indicia occurs (as in the first two rows of Table 2), that transaction is committed. If no match occurs, a timeout is set. If a match occurs before the timeout period expires, the transaction is committed. Otherwise, it is aborted or in some embodiments only an alert or error message are issued, or one or more systems are shutdown, or other remediation action is taken.

The timeout could be a hard timeout during which the system waits. Alternatively, it could be a no-waited timeout in which case the system is alerted via a signal that either something has arrived in the queue or that the timeout has expired.

By using indicia queues in this way, indicia can be reordered so that the indicia in System \L and System \R can be matched and compared.

2. A Transaction Matching Issue

The Transaction Distributor is a critical part of a Validation Architecture System and may consist of a load balancer, for example, which also duplicates the requests to process a transaction. The intent is to ensure that the transactions are processed correctly both by systems \L and \R. Indicia is created by each subsystem representing the changes to be made to the database, and the indicia are compared. However, if the indicia generated on each system from the duplicated transaction are different, then the indicia will not match when compared. For example, if the application uses Globally Unique IDs (GUIDs) they might be randomly assigned on each node while processing steps of the duplicated transaction.

The indicia matching issue can also exist with active/active systems when, for example, the database or system assigns them, e.g. a SYSKEY is assigned when inserting data into a table.

There are several ways to correct for this issue, some of which follow:

(i) Modify the applications/OS/database so that they work the same to produce matching indicia. This assumes the source code for the component is available for modification.

(ii) The Transaction Distributor or another object in the system could hold a table of correspondence between the diverging indicia. The indicia would be retrieved from each node and the correspondence table used to map the indicia (or subsets of the data that diverge) to each other.

(iii) Use a generator that is common or deterministic to prevent the divergence of data on each node. For example, the generator could provide the same GUID to each node.

(iv) Like the previous bullet, but only one node generates the data that would otherwise diverge and have it sent to the other node so both nodes use the same data values.

(v) Use an indicia generation scheme which is unaffected by (or accounts for) the expected divergence of data.

(vi) Use an indicia matching scheme which is unaffected by (or accounts for) the divergence of indicia caused by the expected divergence of data.

(vii) Modify the target database to add columns to map the diverging data between the databases.

3. Dynamic Mixed-Mode Active/Active and Validation Architecture

Traditionally, in order for a blockchain to be formed, miners have to solve a very difficult mathematical challenge. This adds a great deal of latency to the use of the blockchain. However, once a miner has solved the problem, it is easy for the other miners to validate the solution.

A low-latency dynamic architecture which has applicability to blockchains, distributed ledgers, and other types of distributed databases is described below and shown in FIG. 13. This figure displays five computer nodes interacting with each other, labeled A, B, C, D, and E. The computers are configured as a dynamic mixed-mode active/active and validation architecture group of systems which cooperate as follows.

In the case of FIG. 13, a request to process a transaction is sent by the Transaction Distributor to an algorithmically-selected subset of the nodes holding copies of the distributed database so that at least two nodes receive the same request to process the transaction, e.g. arbitrarily/randomly selecting nodes B and C, to form a temporary Validation Architecture. The transaction changes are also replicated (directly or indirectly) to the other systems in the network holding copies of the distributed database, as in an Active/Active architecture, by the nodes participating in the temporary Validation Architecture. Nodes B and C in this example calculate indicia based on the changes that each will make to their databases. The indicia generated on the two systems are exchanged and compared (i, and i') and if they match the transactions are committed, otherwise they are aborted (or in some embodiments only an alert or error message are issued, or one or more systems are shutdown, or other remediation action is taken.) The indicia for committed (or about to be committed) transactions are sent (directly or indirectly) to the other systems in the network holding copies of the database/distributed ledger by all of the nodes participating in the validation architecture (ri, and ri'). If the pairs of indicia match (and also optionally the replicated data too) at the other nodes, then the transaction is committed on the replicated nodes; and the transaction is thus entered into the local database/distributed ledger. If the indicia do not match, the transaction is aborted (or ignored or in some embodiments only an alert or error message are issued, or one or more systems are shutdown, or other remediation action is taken) everywhere.

More detail of this method is provided in FIG. 14. In this alternate embodiment, only replicated data is sent to the nodes not participating in the temporary Validation Architecture. Additionally, in this example, one node is remote and the data it receives is routed to it through other intermediary nodes receiving replicated data. Care must be taken to ensure that the sources of the replicated data received from each source at each node is routed through independent intermediary nodes, or if potentially routed through the same node some other form of integrity check, tunneling, or encryption is utilized (e.g. onion routing). That is, in a more complicated topology, the two sets of replicated data might touch the same node and be affected by malware or other issues at that node. Thus, the method could detect this potential routing issue and appropriate means put in place to ensure that the comparisons at each node are for independent sets of data.

If data collisions are possible among the nodes of the system, standard methods of rectifying or avoiding them may be employed via the type of Active/Active replication used. For example, partitioned databases may be used with asynchronous replication, or synchronous replication (e.g. via coordinated commits) may be used if network latency is not an issue. Additionally, a combination of replication types may be employed if certain nodes are more trusted than others, or some nodes are passive and read-only.

4. Alternate Embodiments Using Secondary Indicia

Optionally, each node not selected to participate in the transaction (i.e. nodes not part of the Validation Architecture) which receives the replicated data and indicia ("Replicated Node") can, as part of applying the replication stream, locally compute their own indicia ("Secondary Indicia") for the replicated data received for the transaction. The Secondary Indicia can be then used to verify that node's integrity and reliability by comparing it to the replicated indicia. These Secondary Indicia can also be shared among nodes to quickly verify all nodes are correct and that the Validation Architecture nodes are performing properly. Utilizing Secondary Indicia can also improve latency and resiliency of the system by avoiding the need to receive replication traffic and indicia from all of the Validation Architecture nodes. That is, the Secondary Indicia can be compared to indicia received from just one of the Validation Architecture nodes to know that its local copy is valid. If they don't match, it is uncertain which data is correct, although the other Indicia from the nodes participating in the Validation Architecture, or Secondary Indicia from the other nodes, may be used to make this decision.

5. Secondary Validation Options

There are actually many permutations of embodiments that validate the state of changes made to the database at the Replicated Nodes. Table 3 displays some options follows.

TABLE 3

| SECONDARY VALIDATION OPTION | DATA SENT TO REPLICATED NODE | TYPICAL COMPARISONS TO ENSURE RELIABILITY OF THE LOCAL DATABASE |
| --- | --- | --- |
| 1. Duplicate Replication Feed | Both Validation Architecture Nodes ("VANs") send replicated feed, R and R' to Replicated Node | Replicated Node can compare R to R' before applying the data to its local database. Or, during or after applying one stream, R, compare R to R' before committing the local transaction on the Replicated Node. |
| 2. Duplicate Replication and Indicia Feed | Both VANs send replicated feed, R and R', and indicia, I and I'. | Replicated Node can compare R to R' and/or I to I' before applying the data to its local database. Or, during or after applying one stream, R, compare R to R' and/or I to I' before committing the local transaction on the Replicated Node. |
| 3. Single Replication Feed, Singlei ndependent Indicia Feed | One VAN sends replicated feed, R. and the other sends indicia, I'. | Replicated Node computes Secondary Indicia ("SI") from R. Replicated Node compares SI to I' before applying the data to its local database. Or, during or after applying R, compare SI to I' before committing the local transaction on the Replicated Node. |
| 4. Single Replication Feed, and Original User request is duplicated | One VAN sends replicated feed, R. A node or the transaction distributor sends the original user request. | Replicated Node applies original user request and computes user request SI from results, and a second set of replicated feed SI from the replicated feed. Replicated Node compares the user request SI to the replicated feed SI before committing the local transaction on the Replicated Node. |
| 5. Single independent Indicia Feed, and Original User request is duplicated | One VAN sends the indicia, I. A node or the transaction distributor sends the original user request. | Replicated Node applies original user request and computes user request SI from results. Replicated Node compares the user request SI to the I received from the VAN before committing the local transaction on the Replicated Node. |

TABLE 3-continued

| SECONDARY VALIDATION OPTION | DATA SENT TO REPLICATED NODE | TYPICAL COMPARISONS TO ENSURE RELIABILITY OF THE LOCAL DATABASE |
|---|---|---|
| 6. Only one VAN is on-line (e.g. other VAN is down or inaccessible) | The single VAN sends I and/or R. That VAN or the transaction distributor sends the original user request to process a transaction. | Replicated Node computes replicated feed SI from R or by applying the original user request to get user request SI. Replicated Node compares the SI to I before applying the R data to its local database. Or, during or after applying R or original user request, compares SI to I before committing the local transaction on the Replicated Node. This configuration may be called Single Server Reliability (SSR). |

6. Apparatus of a Preferred Embodiment

FIG. 15 shows the hardware for Active/Active and Validation Architecture that implements a preferred embodiment. Only the left-hand portion of the architecture is depicted with a validation architecture, but one could also exist on the right-hand side as seen in FIG. 6. Specifically, the Transaction Distributor hardware duplicates user requests to process a transaction and sends them to the nodes (\L and \L') that are participating in a Validation Architecture configuration. Those nodes each contain an instance of the Database, a Processor running on one or more CPUs or cores of the hardware of the node. Running inside the Processor are the Application, the Indicia Engine, and the Replication Engine. The Transaction Distributor communicates to the Application instances on the \L and \L' nodes. Each Application makes changes to the Database accessible at that node, and the Indicia Engine and Replication Engine read and process those changes. The Indicia Engine exchanges its indicia with the other nodes participating in the Validation Architecture. The nodes replicate via their Replication Engines to other nodes in the system (i.e. \R and \R'). Those other nodes contain an instance of the database, and a Comparison Engine. The Comparison Engine processes replication traffic and indicia from the nodes involved in the Validation Architecture via the methods described in the disclosure. If the Comparison Engine determines that the received data is valid then it instructs the Replication Engine to commit the associated transaction locally. Both the Indicia Engine and the Comparison Engine have access to queues in order to facilitate matching out-of-order data.

7. Check Integrity Module

In some situations it is desirable to selectively control when and which requests, and their subsequent transactions, are validated and have their integrity checked. In these cases, a Check Integrity Module (CIM) is provided to the system to flag or otherwise control whether or not a request, transaction, or transaction DML subset, is validated and checked for integrity. The module can reside in the transaction distributor, a parent node, or a worker node. It can also simply consist of some specialized code in the API or user interface that the client application uses. A selection decision for if a transaction should be checked, or not checked, may be based upon one or more events or triggers such as:

Upon user request, for example as part of the submitted request, or all from a particular user account.
Certain tables or files are updated.
Randomly assigned such as to keep malware guessing.
A threshold passed such as a transaction dollar amount.
Time of day such as after midnight or right after a major sporting event.
The number of records updated, for example as in every N DML operations (e.g. in a transaction or that the system has processed). Thus this can be set to reduce overhead.
An external trigger, such as an alert is issued or intrusion detected,
Suspected malware is present or might be operating on one or more parts of the system.
Limited to not allow the integrity checking/validation processing to exceed X % of system resources such as CPU.
When transactional latency is maintained below a limit As indicated above, the CIM may un-flag, or stop validation/integrity checking, on certain transactions previously flagged for checking. For security or other purposes the flag/un-flag actions may be held in secret to thwart bad actors.

Some of the possible locations where a Check Integrity Module (CIM) could be located are illustrated in FIG. 16. A sample scenario, based on the figure, for how this may happen is as follows. First, the CIM in the user's application may flag the request for integrity checking as having particular significance to a client. The CIM in the transaction distributor would review the request and may flag it based on the time of day when most fraudulent transactions occur. The transaction distributor picked nodes B and C to process the transaction. The CIM in the nodes may flag the request based on tables updated, the business rules having previously been set to always flag certain tables updates for integrity checking. Lastly, the CIM's in the replicated nodes (e.g. node D) may un-flag the replicated DML operations based on the quantity of DML operations received so far. In this latter case, the replicated nodes may hold back integrity checking until a large number of DML operations have been received thereby batching the check and improving system overhead.

8. Flowcharts for Some Preferred Embodiments Utilizing a Check Integrity Module A flowchart for one preferred embodiment utilizing a Check Integrity Module is shown in FIG. 17. Transaction processing is performed in a system, the system includes a transaction distributor, at least one check integrity module, and a plurality of nodes, each node in the system including (i) a processor, (ii) an application executing in the processor, and (iii) an instance of a database used by the application, each node executing transactions, each transaction including a BEGIN step, one or more data manipulation language (DML) or data definition language (DDL) operations, and a transaction END step which is either a COMMIT or an ABORT, the processing comprising the following steps.

During step 1701 a selection of the nodes to receive the same request to process a transaction is made. During step 1702 the selected nodes receive the same request to process the transaction. During step 1703 the processor at each of the nodes executing in the application the same request to process the transaction. During step 1704 replication of the steps and operations of the transaction up until the transaction END step is accomplished to other nodes in the system. A check integrity module identifies if the transaction should be checked for integrity in step 1705.

If in step 1705 the transaction should be checked for integrity, the following steps happen:
- A. In step 1706.1, compare in the processors at the other nodes in the system the replicated steps and operations of the transactions that were received from the nodes processing the transaction.
- B. In step 1706.2, check if the comparison indicates that the replicated steps and operations of the replicated transaction match each other?
  - i) If YES, execute a COMMIT.
  - ii) If NO, execute an ABORT.

But, if in step 1705 the transaction should not be checked for integrity then a COMMIT is executed.

A flowchart for another preferred embodiment utilizing a Check Integrity Module where indicia is compared is shown in FIG. 18. Transaction processing is performed in a system, the system including a transaction distributor, at least one check integrity module, and a plurality of nodes, each node in the system including (i) a processor, (ii) an application executing in the processor, and (iii) an instance of a database used by the application, each node executing transactions, each transaction including a BEGIN step, one or more data manipulation language (DML) or data definition language (DDL) operations, and a transaction END step which is either a COMMIT or an ABORT, the processing comprising the following steps.

During step 1801 a selection of the nodes to receive the same request to process a transaction is made. During step 1802 the selected nodes receive the same request to process the transaction. During step 1803 the processor at each of the nodes executing in the application the same request to process the transaction. During step 1804 replication of the steps and operations of the transaction up until the transaction END step is accomplished to other nodes in the system. A check integrity module identifies if the transaction should be checked for integrity in step 1805.

If in step 1805 the transaction should be checked for integrity, the following steps happen:
- A. In step 1806.1 the processor at at least one of the selected nodes in step 1801 computing indicia of the outcome of the processing of the same request.
- B In step 1806.2 replicating the computed indicia in step 1806.1 to other nodes in the system.
- C. In step 1806.3 locally computing indicia in the processor at the other nodes in the system from the steps and operations of the transactions replicated in step 1804.
- D. In step 1806.4 comparing in the processor at the other nodes in the system the locally computed indicia with the replicated computed indicia that was replicated in step 1806.2.
- E. In step 1806.5, check if the comparison in step 1806.4 indicates a match?
  - i) If YES, execute a COMMIT.
  - ii) If NO, execute an ABORT.

But, if in step 1805 the transaction should not be checked for integrity then a COMMIT is executed.

9. Summary

Validation architectures prevent data errors and malicious changes from being made to the data while it is being processed by the system and thus ensures data reliability. Active/active architectures are important because they ensure continuous availability of data processing and provide scalability. Combining the two architectures provides significant benefits to the processing of transactions by optimizing/maximizing RAS. A Check Integrity Module addition enables the selective control for when and which requests, and their subsequent transactions, are validated and have their integrity checked.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method of performing transaction processing in a system, the system including a plurality of nodes, each node in the system including (i) a processor, (ii) an application executing in the processor, and (iii) an instance of a database used by the application, each node executing transactions, each transaction including a BEGIN step, and one or more data manipulation language (DML) or data definition language (DDL) operations, the method comprising:
  - (a) selecting at least two of the nodes to receive the same request to process the transaction and validate the outcome of the transaction steps and operations of a transaction;
  - (b) receiving at the at least two nodes the same request to process a transaction;
  - (c) the processor at each of the at least two nodes executing in the application the same request to process the transaction and validating the outcome of the transaction steps and operations;
  - (d) replicating the steps and operations of the transactions from at least one of the at least two nodes to one or more other nodes in the system;
  - (e) sending the same request sent in step (a) to the one or more other nodes in the system;
  - (f) processing the steps and operations of the transaction locally in the processor at the one or more other nodes in the system from the same request received in step (e);
  - (g) comparing in the processor at the one or more other nodes in the system:
    - (i) the replicated steps and operations from step (d), and
    - (ii) the locally processed steps and operations from step (f);
  - (h) executing a COMMIT in the processor at the one or more other nodes in the system when the result of the comparison in step (g) indicates that the locally processed steps and operations and the replicated steps and operations match each other; and
  - (i) executing one or more of the following remediation actions when the result of the comparison in step (g) indicates that the locally processed steps and operations and the replicated steps and operations do not match each other:
    - (i) issuing a database rollback on one of the nodes,
    - (ii) executing self-diagnostics on one of the nodes,
    - (iii) shutting down one of the nodes, (iv) taking one of the nodes or its application offline,
(v) aborting the transaction executing on one of the nodes,
(vi) generating an error indication for one of the nodes, and
(vii) resynchronizing the database at one of the nodes.

2. The method of claim 1 wherein the replication in step (d) occurs via an intermediary node.

3. The method of claim 1 wherein the sending in step (e) occurs via an intermediary node.

4. The method of claim 1 wherein step (a) is performed by a transaction distributor.

5. The method of claim 1 wherein step (e) is performed by a transaction distributor.

6. The method of claim 1 wherein the selecting in step (a) is performed dynamically.

7. A method of performing transaction processing in a system, the system including a plurality of nodes, each node in the system including (i) a processor, (ii) an application executing in the processor, and (iii) an instance of a database used by the application, each node executing transactions, each transaction including a BEGIN step, and one or more data manipulation language (DML) or data definition language (DDL) operations, the method comprising:
 (a) selecting at least two of the nodes to receive the same request to process the transaction and validate the outcome of the transaction steps and operations of a transaction;
 (b) receiving at the at least two nodes the same request to process a transaction;
 (c) the processor at each of the at least two nodes executing in the application the same request to process the transaction and validating the outcome of the transaction steps and operations;
 (d) computing in the processor at at least one of the at least two nodes indicia of the outcome of the processing of the same request;
 (e) replicating the indicia computed in step (d) to one or more other nodes in the system;
 (f) sending the same request sent in step (a) to the one or more other nodes in the system;
 (g) computing indicia locally in the processor at the one or more other nodes in the system from the outcome of processing the same request received in step (f);
 (h) comparing in the processor at the one or more other nodes in the system:
  (i) the replicated indicia from step (e), and
  (ii) the locally computed indicia from step (g);
 (i) executing a COMMIT in the processor at the one or more other nodes in the system when the result of the comparison in step (h) indicates that the locally computed indicia and the replicated indicia match each other; and
 (j) executing one or more of the following remediation actions when the result of the comparison in step (h) indicates that the locally computed indicia and the replicated computed indicia do not match each other:
  (i) issuing a database rollback on one of the nodes,
  (ii) executing self-diagnostics on one of the nodes,
  (iii) shutting down one of the nodes,
  (iv) taking one of the nodes or its application offline,
  (v) aborting the transaction executing on one of the nodes,
  (vi) generating an error indication for one of the nodes, and
  (vii) resynchronizing the database at one of the nodes.

8. The method of claim 7 wherein the replication in step (e) occurs via an intermediary node.

9. The method of claim 7 wherein the sending in step (f) occurs via an intermediary node.

10. The method of claim 7 wherein step (a) is performed by a transaction distributor.

11. The method of claim 7 wherein step (f) is performed by a transaction distributor.

12. The method of claim 7 wherein the selecting in step (a) is performed dynamically.

* * * * *